United States Patent [19]

Lyon et al.

[11] E Re. 30,540

[45] Reissued Mar. 10, 1981

[54] HEAT STORAGE WATER TANK

[75] Inventors: Floyd A. Lyon, Brookville, N.Y.; Henry Harrison, deceased, late of Locust Valley, N.Y., by Dorothy D. Harrison, administratrix

[73] Assignee: Halm Instrument Co., Inc., Glen Head, N.Y.

[21] Appl. No.: 962,143

[22] Filed: Nov. 20, 1978

Related U.S. Patent Documents

Reissue of:

[64] Patent No.: 4,108,374
Issued: Aug. 22, 1978
Appl. No.: 709,587
Filed: Jul. 29, 1976

[51] Int. Cl.[3] ..... F24D 11/00

[52] U.S. Cl. ..... 126/421; 126/400; 126/428; 126/435; 126/437; 165/104 S

[58] Field of Search ..... 165/104 S; 126/271, 126/270, 374, 400, 421, 428, 435, 437; 237/1 A

[56] References Cited

U.S. PATENT DOCUMENTS

| | | | |
|---|---|---|---|
| 333,672 | 1/1886 | Richardson | 237/56 |
| 1,209,956 | 12/1916 | Gesell | 126/271 X |
| 2,553,302 | 5/1951 | Cornwall | 237/1 A X |
| 3,369,541 | 2/1968 | Thomason | 126/400 |
| 4,082,143 | 4/1978 | Thomason | 126/400 |

*Primary Examiner*—Albert J. Makay
*Assistant Examiner*—Harold Joyce
*Attorney, Agent, or Firm*—James P. Malone

[57] ABSTRACT

A heat storage tank suitable for solar house heating systems. The tank includes a rigidly supported bottom panel covered with a layer of stones of substantially uniform size which are bonded together thermally and mechanically at their points of contact with each other, but which have voids forming air passages remaining between them, bottom insulation below said bottom panel, a bottom air passage between the bottom insulation and the bottom panel, and at least one opening in the bottom panel whereby air can pass from said bottom air passage into said layer of stones.

11 Claims, 9 Drawing Figures

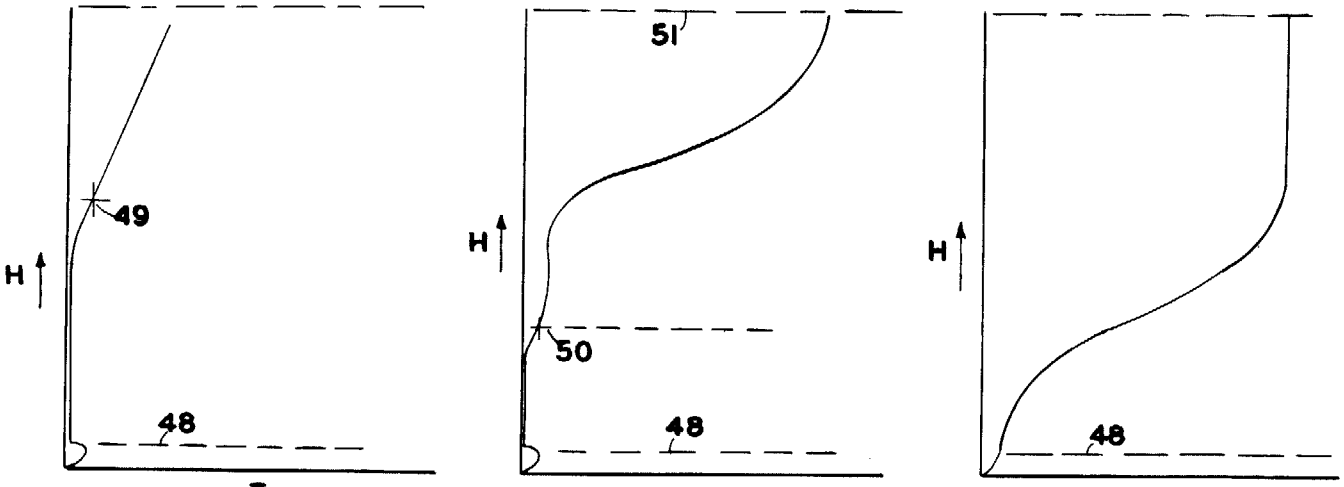
FIG 3
FIG 4
FIG 5
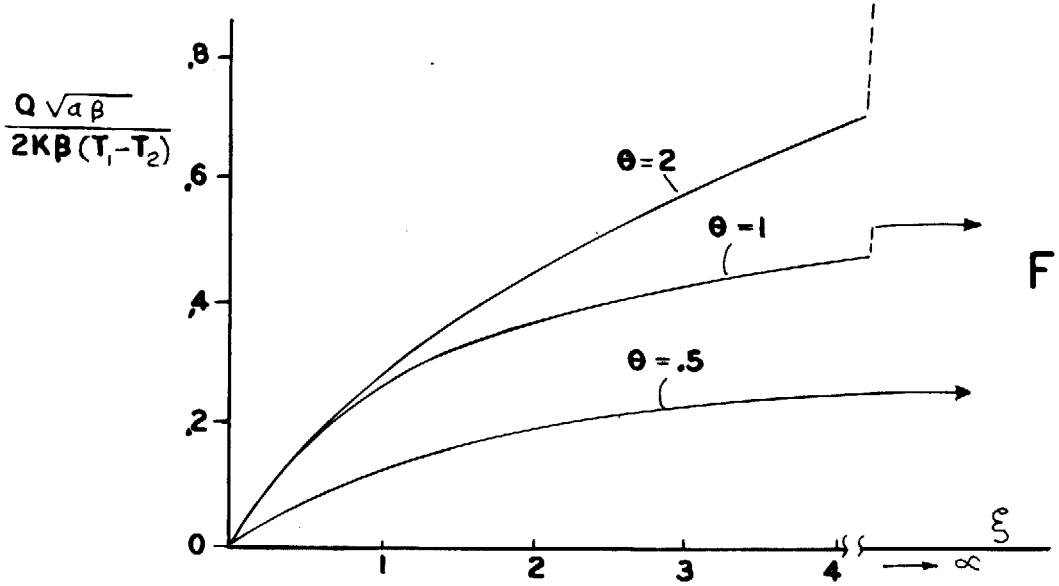
FIG 6

FIG 7
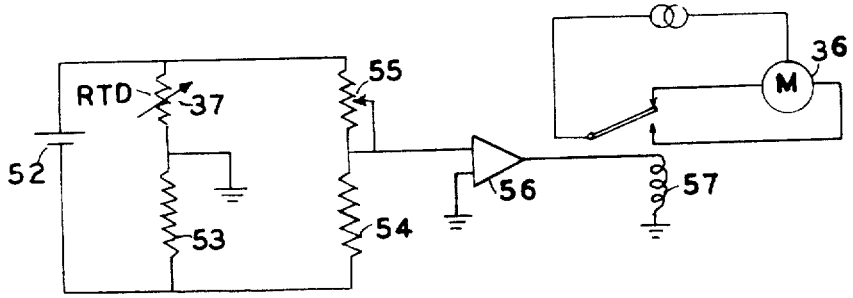
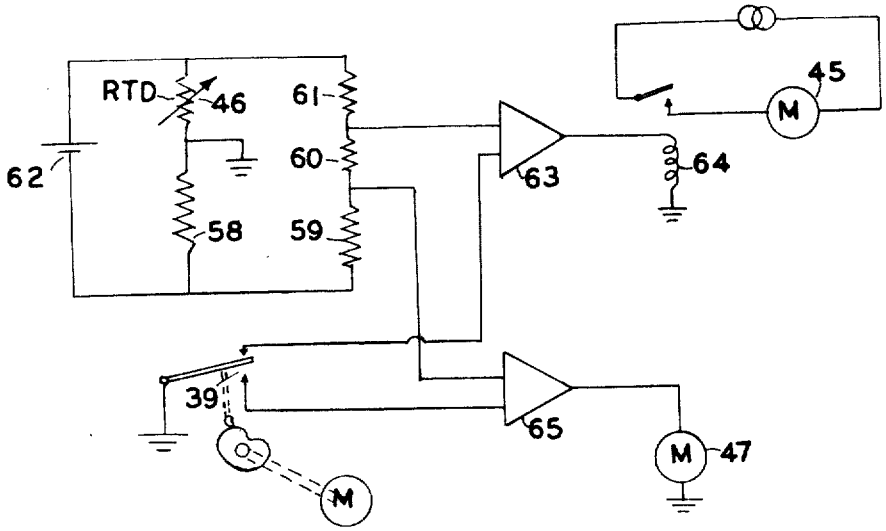
FIG 8

HEAT STORAGE WATER TANK

Matter enclosed in heavy brackets [ ] appears in the original patent but forms no part of this reissue specification; matter printed in italics indicates the additions made by reissue.

Where heat is produced by a variable source such as terrestrial sunlight and used to maintain the temperature of a variable heat load such as a house, it is essential to provide some means of storing heat. A tank of water is frequently used for this purpose, because water is readily available and has a high heat capacity. Sunlight adds heat to the water, raising its temperature, and the load withdraws heat from the water, lowering its temperature. In simple systems for house heating, the tank water temperature must stay above the desired inside temperature of the house. At the other extreme, many practical problems with tank materials and structures arise unless the tank water temperature is kept below the boiling point (212° F. at sea level), and for many materials, 180° F. is a top limit. The amount of water required for storing a given amount of heat is inversely proportional to the temperature range of the water in the tank.

Not all the water in a tank is at the same temperature. Warmer water rises to the top and cooler water settles to the bottom, because the warmer water expands and becomes less dense. Water itself is a fairly good insulator, so that heat flow, in the absence of mass flow, is slow. A tank in which hotter water stands at the top and cooler water at the bottom is said to be stratified.

In solar heating systems, a fluid is passed in succession through a sun-heated collector where it is heated by absorbed sunlight; and a heat exchanger where it warms the water in the heat storage tank. "Used" fluid issuing from the heat exchanger returns to the collector for re-heating. If the fluid is water, it may circulate directly through the tank, making a separate heat exchanger unnecessary. Other heat transfer fluids, such as air, oil, or ethylene glycol, require a suitable heat transfer structure to keep them from mixing physically with the tank water.

Since the solar heat collector is in a cold ambient environment, it loses heat at a rate in proportion to the average temperature of the fluid being heated in it. Maximum efficiency of heat collection is, therefore, promoted by keeping the temperature of the "used" fluid entering the collector as low as possible. This lowest possible tank temperature is approximately equal to the desired house heating temperature.

Delivery of heat from the storage tank to the house takes place continuously, and thus is at a much lower peak rate than delivery of heat to the tank from intermittently operated solar collectors. In most house heating systems, heat is finally delivered by warmed air. This air must be warmed at least to the temperature of the room, but if a large air flow rate is provided, it need not be warmed much above room temperature to deliver the heat required to keep the room warm. If a large exchanger is provided to transmit heat from the storage tank water to the circulating room air, the required amount of heat can be transmitted by tank water only slightly above room temperature.

Thus, the water at the bottom of the storage tank should be kept close above room temperature, while the water in the remainder of the tank should be stratified with the top layer at the maximum storage temperature, extending to a depth corresponding to the amount of heat stored.

A tank designed to store heat over an entire year must be very well insulated to prevent excessive losses to its surroundings. It is well known that the amount of heat collector area required by a house heating system which stores heat for an entire year is less than half the collector area required for short-term storage systems.

Thus, it is the primary object of this invention to provide a long-term heat storage tank construction and control system which will produce efficient collection, storage, and delivery of solar heat energy.

A more specific object is to provide a practical, well-insulated hot water storage tank having a large air-water heat exchanger on its lower surface.

A second specific object is to provide a means for controlling the temperature of the water layer in contact with the heat exchanger.

A third specific object is to provide a means for controlling the circulation of fluid through solar collectors so that the storage tank water temperature is sharply stratified with maximum storage temperature at the top, while the collectors are operated at the lowest practical temperature.

Another object of the invention is to provide a heat storage tank suitable for solar house heating systems, including: a rigidly supported bottom panel covered with a layer of stones of substantially uniform size which are bonded together thermally and mechanically at their points of contact with each other, but which have voids forming air passages remaining between them, bottom insulation below said bottom panel, a bottom air passage between said bottom insulation and said bottom panel, and at least one opening in said bottom panel whereby air can pass from said bottom air passage into said layer of stones; rigidly braced side panels having an inner layer of outside insulation and an outer layer of outside insulation and a continuous side air passage between them, communicating with the surface of said layer of stones, and with a plenum chamber near the top of said side panels, whereby air may pass from said bottom air passage through said layer of stones, through said side air passage to said plenum chamber; a lining impervious to water having a bottom, sides, and a top, and top insulation above said top; means for transferring heat from a solar heat collector to water contained in said tank, and heat delivery fluid means for delivering heat from said tank; means for circulating water from a controllable height within said tank to the inside bottom surface of said tank, and means for constraining said circulating water to flow over the inside bottom tank surface whereby the temperature of said inside bottom surface is kept substantially equal to the temperature of water at said controllable height; and control means responsive to the temperature of said heat delivery fluid for adjusting said controllable height, and for adjusting the rate of said means for transferring heat from a solar heat collector responsive to said controllable height and to the temperature at said solar collectors.

It will be apparent to those skilled in the art that these objects and others are achieved by the construction and control systems now to be described in some detail with the help of the accompanying drawings.

FIGS. 3, 4, and 5, are graphs showing water temperature plotted against depth in the tank for various conditions of operation.

FIG. 6 is a graph of heat transfer within the heat exchanger related to thickness of the heat transfer layer and length of the air path.

Figure 1:
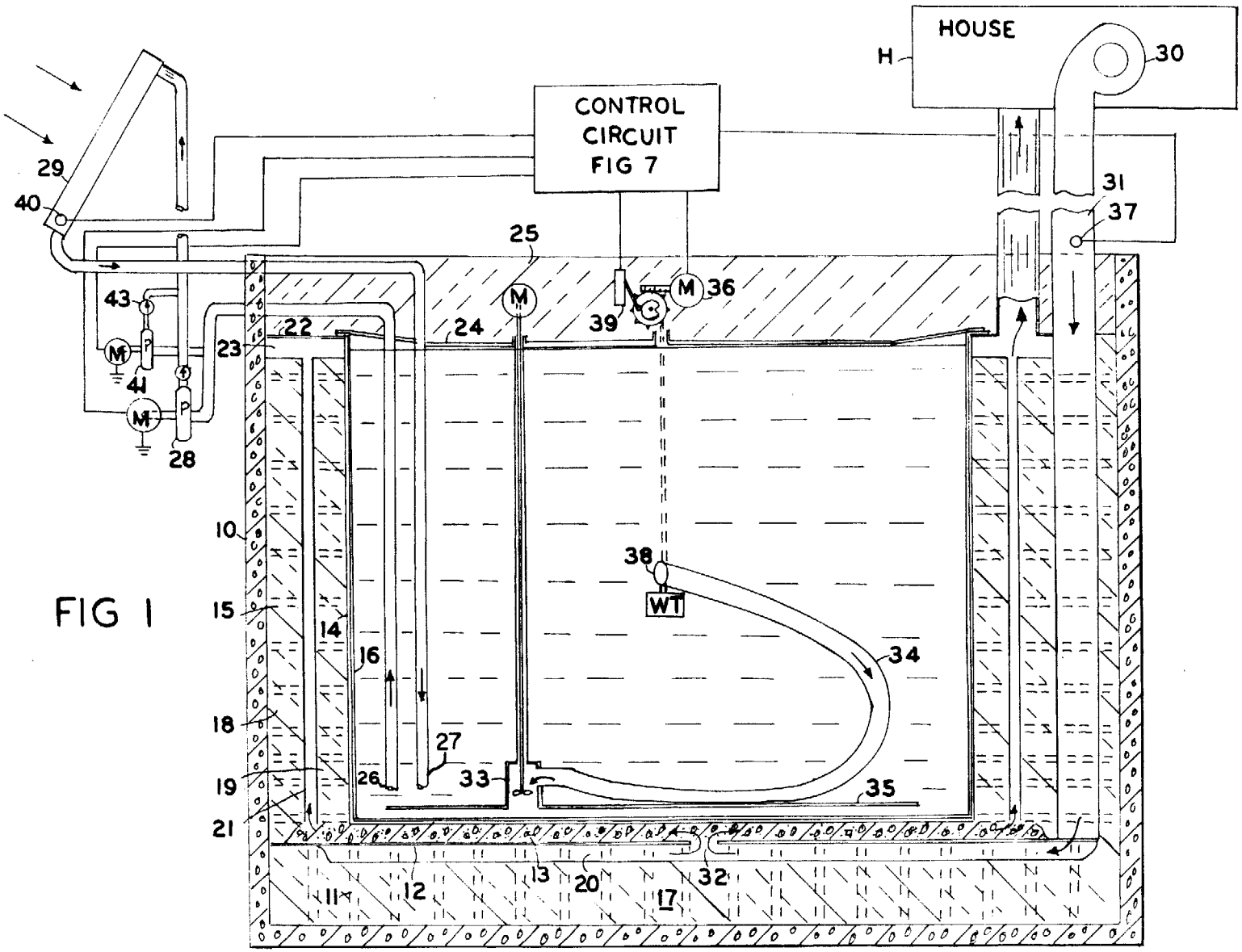
FIG. 1 is a general section view of an insulated tank and heat exchanger according to this invention, showing means for supplying heated water from a solar collector and means for delivering heat to a house from the tank.
Figure 2:
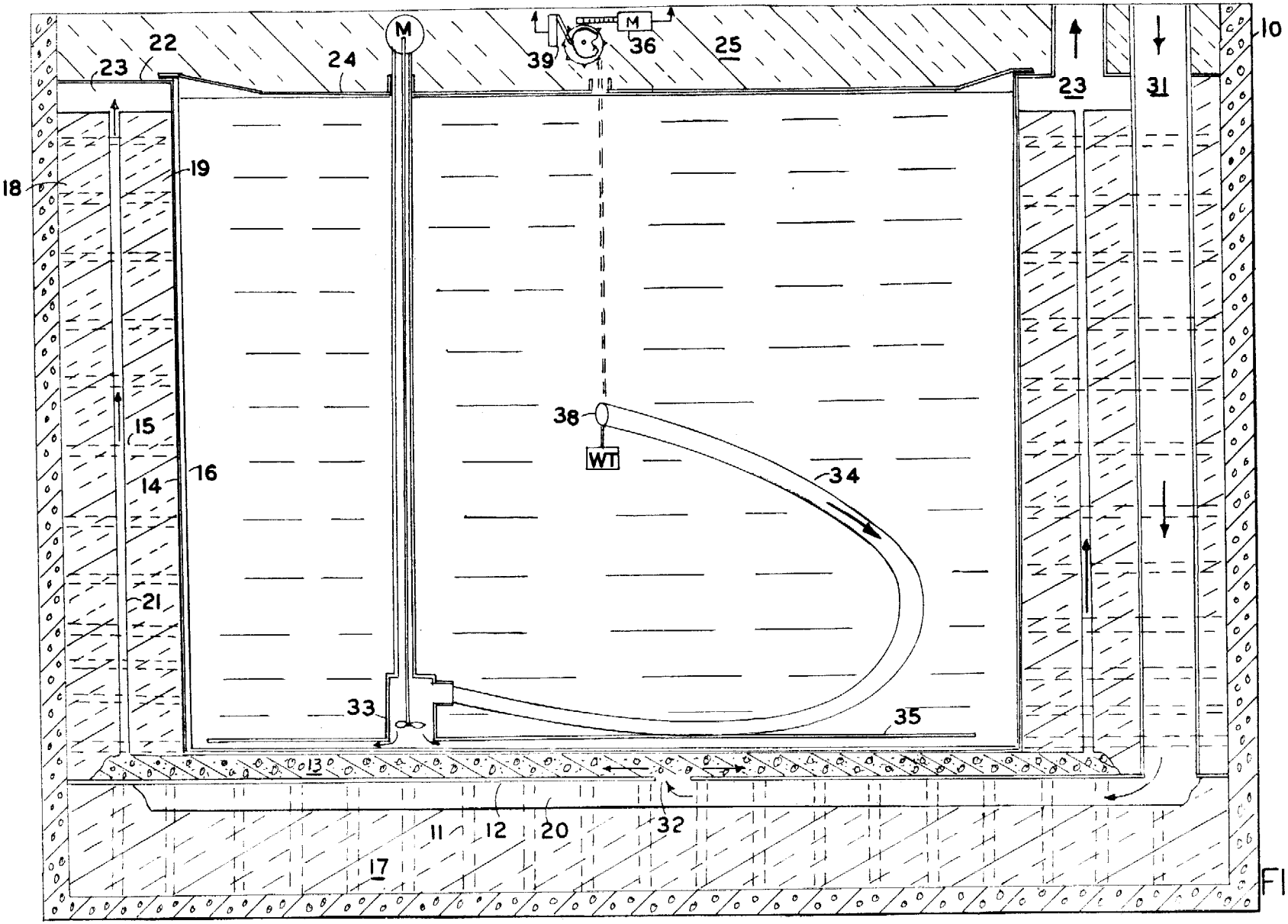
FIGS. 2 and 2A are a section of an insulated tank and heat exchanger showing air means for transferring heat from an air-heating solar collector to the tank.

FIGS. 7 and 8 are simplified circuit diagrams for the control circuits shown schematically in FIGS. 1 and 2.

Turning to FIG. 1, the tank is nested in a concrete pit 10. Short vertical wooden posts or legs 11, support a bottom platform 12, which may be of plywood. On top of the platform is a layer 13, several inches thick of stones, graded for size, bonded together with cement, which form a heat exchanger as taught in copending U.S. Pat. application, Ser. No. 618,502, filed on Oct. 1st, 1975. Side panels 14 are braced from the walls of the pit by horizontal wood posts 15. The tank has a durable, waterproof liner 16, which may be fabricated of butyl rubber. The tank is substantially full of water.

Layers of fiberglass insulation, 17, 18 and 19, are disposed around the legs 11, and braces 15. A horizontal feed air passage 20, is provided between the platform 12, and the insulation layer 17. Vertical air passages 21, are provided between the insulation layers 18 and 19, jacketing the sides of the tank.

The top edge of the tank is closed by panels 22, which create a plenum passage 23, at the top of the air passages 21. A waterproof, durable flexible cover 24, which may be of fabric reinforced butyl rubber is secured to the top edge of the tank. It floats on the water in the tank, supporting a thick layer of fiberglass insulation 25.

Heat may be brought to the tank by a piping system and a pump which circulates water from the tank through any of the many known designs of solar heat collector. This piping system is shown with an inlet 26, and an inlet 26, and an outlet 27, both near the bottom of the tank. Water drawn into the inlet is forced by pump 28, through collector 29, draining back into the tank through piping outlet 27.

Heat is delivered from the tank by an air circulating system. Air drawn from the house H is forced into the passage 20, by a blower 30 and duct 31. It issues from passage 20, through an opening 32, which may be a slot, a series of holes, or a grating, into the grouted gravel layer 13, where it flows outward toward the sides of the tank, absorbing heat from the bottom of the tank. From the gravel layer, the air flows into the passages 21, and upward to the plenum passage 23. In passage 21, the air flow forms a sheath around the tank, defining the temperature at that passage approximately at the temperature of the house, and thus limiting the rate of heat flow to the concrete walls 10, regardless of the temperature of the water inside the tank.

By natural convection, the coolest water in the tank will be at the bottom, where it is drawn into the inlet 26 of the piping to the collector. Warmed water delivered from the collector rises in the tank, where it becomes stratified according to temperature.

In the absence of provision to bring heat to the bottom of the tank, heat will flow out into the circulating house air until the tank bottom is too cold to provide enough heat. Therefore, this invention includes a water-circulating pump 33, which runs continuously, a flexible inlet hose 34, and a weighted horizontal barrier membrane 35, just above the bottom of the tank. By means of a servomotor 36, responsive to temperature at the sensor 37, in the air duct 31, the inlet opening 38 is slowly automatically raised or lowered in the tank to find the water stratum of the desired temperature, and this water is spread over the bottom under the confining barrier 35.

To make full use of the heat storage capacity of this tank, it is necessary to store heat at the maximum temperature which the tank materials can endure. On the other hand, when heat is being delivered faster than it is being stored, it should be collected at temperatures only a little above use temperatures. Limit switch 39, which senses whether the circulation inlet 38 is at the bottom of the tank tells whether the tank is gaining or losing heat. If the inlet 38 is anywhere above the bottom of the tank, net heat is flowing out, but if it is at the bottom, net heat is flowing in for storage. In the first case, maximum circulation through the collector is called for, but in the second, circulation should be slowed down to produce the highest tolerable temperature as measured at the collector 29, by sensor 40.

The means shown for slowing down the water flow to achieve high temperatures is a smaller pump 41, connected in parallel with the pump 28. Check valves 42 and 43 in series with the pumps prevent back flow when only one pump is running. Under optimum sunlight and high outdoor temperature, the top tank temperature is reached with full speed of pump 41. The variable speed motor driving pump 41 is slowed to keep the temperature at sensor 40, up when sunlight is less or outdoor temperature is lower.

When the circulating pump inlet 38 is not at the bottom of the tank, pump 28 runs and pump 41 is shut off as long as the temperature at the sensor 40 is above the bottom tank temperature.

When pipe inlet 38 is up, net heat is flowing out and switch 39 activates large pump 28 for maximum circulation in the collector and pump 41 does not run.

When pipe inlet 38 is down, net heat is flowing in and switch 39 activates small pump 41 and large pump 28 does not run. The speed of pump 41 is controlled by temperature sensor 40.

The circuit performing this function is illustrated in more detail in FIG. 7.

Figure 2A:
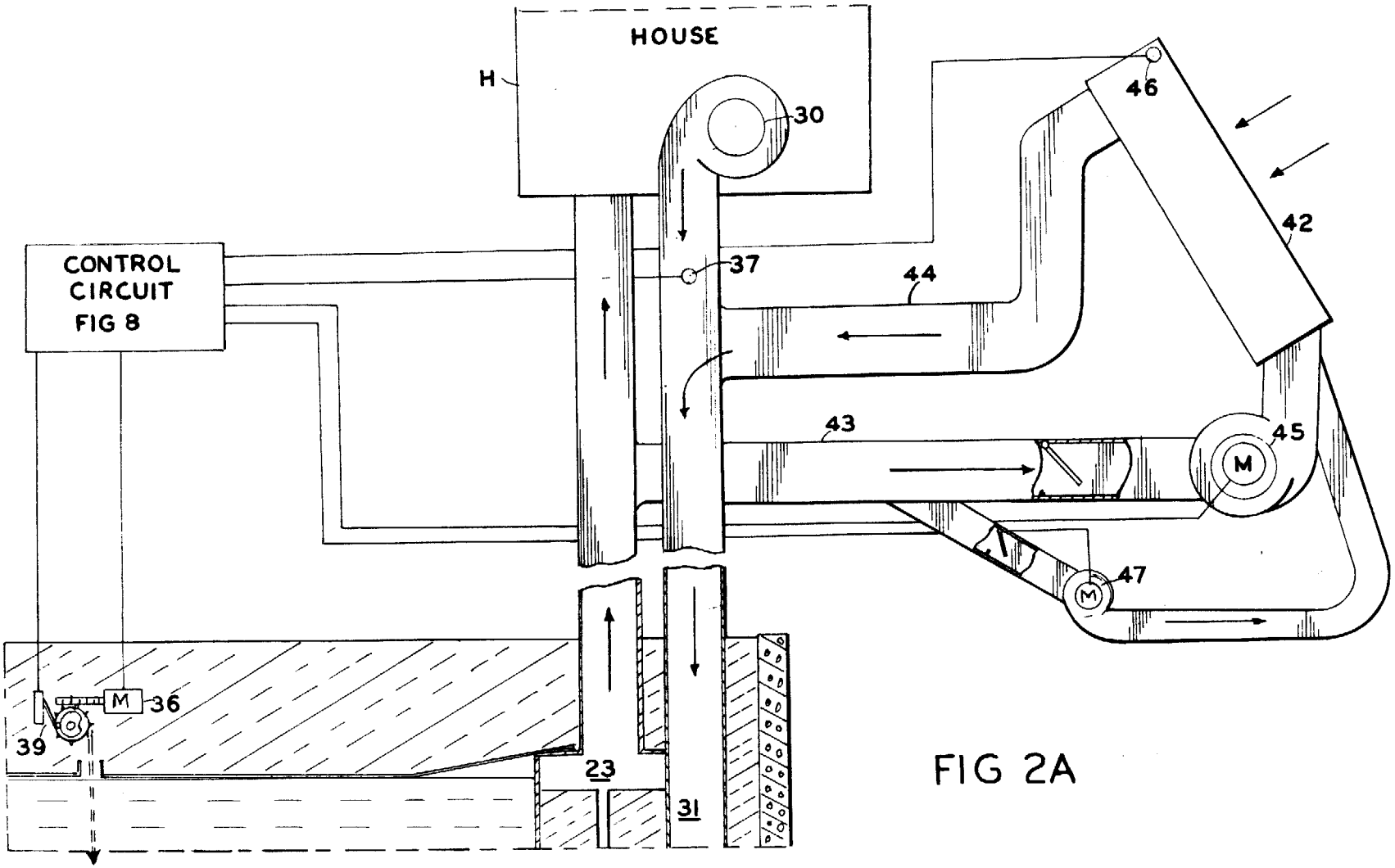

FIGS. 2 and 2A show essentially the same tank as FIG. 1, except that an air-heating solar heat collector is used instead of a water-heating collector. The same grouted gravel heat exchanger which is used for delivering heat to the house is now also used for absorbing heat from air coming from the solar heat collector. The duct system to the solar heat collector 42, includes an inlet duct 43, connected to the plenum 23, and an outlet duct 44, connected to the air passage 20. As long as the circulator input 38, is not at the bottom of the tank, a blower 45, drives heat transfer air through the collector loop whenever the temperature at sensor 46, is above minimum tank temperature. If the circulator input is at the bottom of the tank, a smaller parallel blower 47, operates at controlled speed to supply heat at maximum tank storage temperature.

The circuit performing this function is illustrated in more detail in FIG. 8.

There are many possible known control circuits for accomplishing the control functions which have been described. The particular simplified circuits illustrated in FIGS. 7 and 8 make use of variable resistance temperature sensors generally known as RTD's.

In FIG. 7, the three wire reversible A.C. motor 36, FIG. 1, is activated in response to the temperature at sensor 37 in such a way that inlet 38, is moved upward when the temperature at 37 is below a preset temperature and downward when it is above that preset temperature. A Wheatstone bridge circuit consisting of the RTD 37, resistors 53 and 54, and an adjustable rheostat 55, is energized from a D.C. source 52. The difference voltage from the bridge works through amplifier 56 to energize relay 57, which connects motor 36 to run upward or downward in response to the temperature at 37.

In FIG. 8, the temperature sensor at 46, FIG. 2A, controls motors 45 and 47. RTD 46 and resistors 58, 59 and 60 in series, and 61 form a Wheatstone bridge energized by D.C. source 62, to produce a positive signal when the temperature at 46 exceeds a predetermined minimum useful temperature. If the cam-actuated switch 39 shows the inlet 38 to be above the bottom of the tank this positive signal is amplified at 63, energizing relay 64 to turn on motor 45, causing rapid circulation of heat-transfer fluid through the collector.

If the cam actuated switch 39 shows the inlet 38 to be at the bottom of the tank, amplifier 63 becomes inoperative, but the power amplifier 65 becomes responsive to the potential at the junction between resistors 59 and 60. It drives motor 47 at a speed responsive to the temperature at 46. When the temperature approaches a predetermined upper safe limit, corresponding to the choice of resistors 58, 59, 60 and 61, the motor 47 runs at maximum speed. As the temperature falls below that limit, the motor speed also falls rapidly. Thus the temperature of the circulating heat transfer fluid, which rises when the circulation rate falls, is kept near the maximum temperature which the tank can endure.

It will be evident that the same circuits can be used with the embodiment of FIG. 1, if only sensor 40 replaces sensor 46, and the motors of pumps 28 and 41, replace motors 45 and 47.

FIGS. 3, 4 and 5, show temperature distributions in the tank for various conditions of operation. Temperature T is plotted on a horizontal scale and height H above the bottom of the tank on a vertical scale.

FIG. 3 shows the condition when the tank contains little stored heat and more heat is being taken from the bottom every day than the collector supplies. The warmest water is at the top, and a growing depth of the coldest water starts at 48, just above the confined layer which delivers heat to the house air. The temperature in the confined layer at the bottom is maintained by circulating water brought down from 49.

FIG. 4 shows the condition when there is a substantial amount of heat stored, and heat is coming from the collector faster than it is being delivered. Now the cold water layer above 48 is thinner but circulating warmer water still is brought down from 50. The point 50 is moving downward as water heated by the collector increases the warmed layer between 50 and 51, at the expense of the cold layer between 48 and 50.

FIG. 5 pictures a temperature distribution when heat is coming in faster than it is being delivered. The confined layer is now the coldest water in the tank, and circulating water of suitable temperature can be taken from 48. Water going to the collector from 48 returns hot, rising to the top of the tank. This increases the layer of maximum temperature water at the expense of the coldest water at the bottom.

Thus, it is seen that the temperature of the collector is always kept as low as possible consistent with storage of heat at the highest temperature the tank can tolerate. When heat is being delivered, the collector receives water at the lowest tank temperature and returns it only a little warmer than house air. When heat is being stored, the collector first warms all the cold water in the tank to usable temperature. Then it takes in the coolest remaining water and delivers it at maximum tank temperature. In this way, maximum collector efficiency and maximum heat storage capacity are both assured.

The curves of FIG. 6 are theoretical curves showing how much heat transfer can be expected in a grouted gravel bed having a given thickness, length of air path, width of air path, heat conductivity, and air flow speed. In English units, let t be the bed thickness, l be the bed length, and w be the bed width, all in feet. Let d be the stone diameter inches, v be the air speed in feet per second, and k be the heat conductivity of the stone bed in BTU/hr ft °F. Let $T_1$ be the temperature of entering air and $T_2$ be the temperature of water at the tank bottom, in degrees Fahrenheit.

The solution of the differential equation for heat flow in the rock bed can be expressed in terms of a dimensionless length $\xi = l/\beta$ and a dimensionless thickness $\theta = t/\sqrt{\alpha\beta}$. In English units, the characteristic length $\beta$ is approximately 0.287 $v\phi$ ft., while the characteristic thickness $\sqrt{\alpha\beta}$ is about 0.148 $(kd)^{\frac{1}{2}}$ ft.

The solution can be expressed in a triple summation over the indices n, m, and s, where m is restricted to odd integers and s, to even integers less than m. Q is the rate heat flows into the tank, BTU/hr.

$$\frac{\sqrt{\alpha\beta}}{2K\beta}\,\frac{Q}{W(T_1 - T_2)} = \frac{2 - \sin\theta}{\theta(2 - \cos\theta}\sum_{n}^{\infty}(-1)^{n-1}\left(1 + \left(\frac{2\theta}{n\pi}\right)^2\right)\left(1 - e^{-\frac{1}{1+\left(\frac{2\theta}{n\pi}\right)^2\xi}}\right)\cdot$$

$$\sum_{m\ \mathrm{odd}}^{\infty}\left(\frac{2}{\pi}\right)^m \theta^m \frac{1}{n^m}\sum_{s\ \mathrm{even}}^{m-1}\left(\frac{\pi}{2}\right)^s \frac{n^s}{S!}(-1)^{\frac{s}{2}}.$$

The notation S! means S factorial.

The curves in FIG. 6, for three particular values of the dimensionless rock bed thickness $\theta$, are numerically computed from this formula. Two simplifying assumptions have been made, that net heat conduction of the air in the thickness direction is negligible and that heat conduction through the rock in the length direction is negligible. These curves agree qualitatively with experimental results.

The usefulness of these curves is that they enable a person skilled in the art to estimate the heat transfer effectiveness of a rock bed having a given stone size, length, width, thickness, rock conductivity, and heat transfer air speed. For example, it can be deduced from FIG. 6 that the heat flow increases with total area of the stones, but is less than proportional to that area. Thus, FIG. 6 provides a means of testing whether a given rock bed design will have adequate heat transfer capacity and of determining how economic it will be.

Having described a heat storage tank which will store heat efficiently for long periods of time and a control system suitable for efficient collection, storage and delivery of solar heat energy, and having explained the design sufficiently to be useful to those skilled in the art,

What we claim is the following:

1. A heat storage tank suitable for solar house heating systems having a solar heat collector, including:

a rigidly supported bottom panel covered with a layer of stones of substantially uniform size which are bonded together thermally and mechanically at their points of contact with each other, but which have voids forming air passages remaining between them, bottom insulation below said bottom panel, a bottom air passage between said bottom insulation and said bottom panel, and at least one opening in said bottom panel whereby air can pass from said bottom air passage into said layer of stones;

rigidly braced side panels having an inner layer of outside insulation and an outer layer of outside insulation and a continuous side air passage between them, communicating with the surface of said layer of stones and a plenum chamber near the top of said side panels, whereby air may pass from said bottom air passage through said layer of stones, through said side air passage to said plenum chamber;

a lining impervious to water having a bottom, sides and a top, top insulation mounted above said lining top;

means connected for transferring heat from a heat source to water contained in said tank, and heat delivery fluid means for delivery of heat from said tank;

means for circulating water from a controllable height within said tank to the inside bottom surface of said tank, and means for constraining said circulating water to flow over the inside bottom surface of said tank, whereby the temperature of said tank inside bottom surface is kept substantially equal to the temperature of water at said controllable height; and control means responsive to the temperature of said heat delivery fluid for adjusting said controllable height, and for adjusting the rate of said means for transferring heat from the solar heat collector responsive to said controllable height and to the temperature at said solar collector.

2. A heat storage tank suitable for solar house heating systems according to claim 1, in which said means for transferring heat from the solar collector includes a piping system and a pump for drawing water from near the bottom of said tank, circulating it through said collector and returning it near the bottom of said tank.

3. A heat storage tank suitable for solar house heating systems according to claim 1, in which said means for transferring heat from a solar collector includes a duct system and a blower for drawing air from said plenum, circulating it through said solar heat collector and returning it to said bottom air passage.

4. A heat storage tank suitable for solar house heating systems according to claim 2, in which said control means controls the means for transferring heat from the solar collector so that, water is circulated through said collector by said pump only when the temperature of said collector is above a minimum useful temperature, water for circulating to said collector is substantially the coldest water in said tank, when the coldest water in said tank is below a useful temperature, water is circulated to said collector at a maximum rate, and when the coldest water in said tank is at least at useful temperature, water is circulated to said collector at a reduced rate, returning to said tank at the highest temperature permissable in said tank.

5. A heat storage tank suitable for solar house heating systems according to claim 3, in which said control means controls the means for transferring heat from a solar collector so that, air is circulated through said collector by said blower only when the temperature of said collector is above a minimum useful temperature, when the coldest water in said tank is below a useful temperature, air is circulated to said collector at a maximum rate, and when the coldest water in said tank is at least at useful temperature, air is circulated to said collector at a reduced rate, returning to said tank at the highest temperature permissable in said tank.

6. A heat storage tank suitable for solar house heating systems, including:

a rigidly supported bottom panel, a heat exchanger mounted under said bottom panel, a bottom air passage connected to said heat exchanger, rigidly braced side panels connected to said bottom panel having an inner layer of outside insulation and an outer layer of outside insulation, a continuous side air passage between them, a plenum chamber near the top of said side panels communicating with said air passage whereby air may pass from said bottom air passage through said heat exchanger, through said side air passage to said plenum chamber;

means connected for transferring heat from a heat source to water contained in said tank, and heat deliver fluid means for delivery of heat from said tank, means connected to said tank for circulating water from a controllable height within said tank to the inside bottom surface of said tank, and means in said tank for constraining said circulating water to flow over the inside bottom surface of said tank, whereby the temperature of said tank inside bottom surface is kept substantially equal to the temperature of water at said controllable height.

*7. In a liquid filled heat storage tank, a heat exchanger, means movable in height connected inside the tank and connected to the heat exchanger for drawing liquid from a controllable height within said tank, passing said liquid through said heat exchanger for delivering heat to use,*

*and means connected to the liquid drawing means for returning said liquid to said heat storage tank at the bottom of said tank,*

*whereby the temperature of said heat exchanger is kept substantially equal to the temperature of said liquid at said controllable height.*

*8. In a liquid-filled heat storage tank according to claim 7, a solar collector, means connected for drawing said liquid from the bottom of said tank and circulating said*

*liquid through said solar collector and returning said liquid to said tank.*

*9. A liquid-filled heat storage tank according to claim 8 and control means for limiting the rate of flow of said liquid to said collector so that liquid returned from said solar collector to said tank is at maximum allowable storage temperature.*

*10. A liquid-filled heat storage tank according to claim 7 wherein said heat exchanger is the bottom of said tank and the liquid drawn from said controllable height is constrained beneath a barrier membrane to flow over the area of said bottom of said tank before escaping to the upper side of said membrane.*

*11. A liquid-filled heat storage tank according to claim 10 and means for drawing said liquid from the bottom of said tank, circulating said liquid through a solar collector and returning said liquid at maximum allowable storage temperature to said tank.*

* * * * *